United States Patent [19]

Brune et al.

[11] 4,407,111
[45] Oct. 4, 1983

[54] INFIELD MOBILE SYRUP EXTRACTOR

[75] Inventors: Arlen G. Brune; Nelson Schmidt, both of Columbus, Tex.

[73] Assignee: Gus Glasscock, Houston, Tex.

[21] Appl. No.: 296,436

[22] Filed: Aug. 26, 1981

[51] Int. Cl.³ .............................................. A01D 45/10
[52] U.S. Cl. ....................................... 56/16.4; 56/13.3; 56/DIG. 1
[58] Field of Search ....................... 56/16.4, 13.3, 13.9, 56/1, DIG. 1, 330, 14.2.; 100/121

[56] References Cited

U.S. PATENT DOCUMENTS

| | | | |
|---|---|---|---|
| 3,207,063 | 9/1965 | Major | 100/121 |
| 3,263,405 | 8/1966 | Rohmfeld | 56/DIG. 1 |
| 3,505,701 | 4/1970 | Keil | 100/121 |
| 3,523,411 | 8/1970 | Waldrop et al. | 56/DIG. 1 |
| 4,109,448 | 8/1978 | Kline | 56/1 |
| 4,269,022 | 5/1981 | Adams | 56/330 |

FOREIGN PATENT DOCUMENTS 2019731  11/1979  United Kingdom ................ 56/16.4

*Primary Examiner*—Jay N. Eskovitz
*Attorney, Agent, or Firm*—Gunn, Lee & Jackson

[57] ABSTRACT

The preferred and illustrated embodiment of this disclosure sets forth a harvesting device for stalk crops such as sweet sorghum or sugar cane. The apparatus incorporates a pair of spaced counter-rotating cutter blades which include cutters or splines which pinch the stalks at many places to feed the stalks. They feed the stalks toward an extraction drum. The extraction drum crushes the stalks cooperative with a pair of counter-rotating rollers. This squeezes the recoverable liquid and pulp from the stalk, and that flows downwardly into the bottom of the apparatus where a container collects it and it is subsequently removed. The dry, broken pieces of the stalks are then fed out of the apparatus into a chopper and then into a large centrifial blower which blows the pulp and chopped pieces away from the apparatus.

4 Claims, 6 Drawing Figures

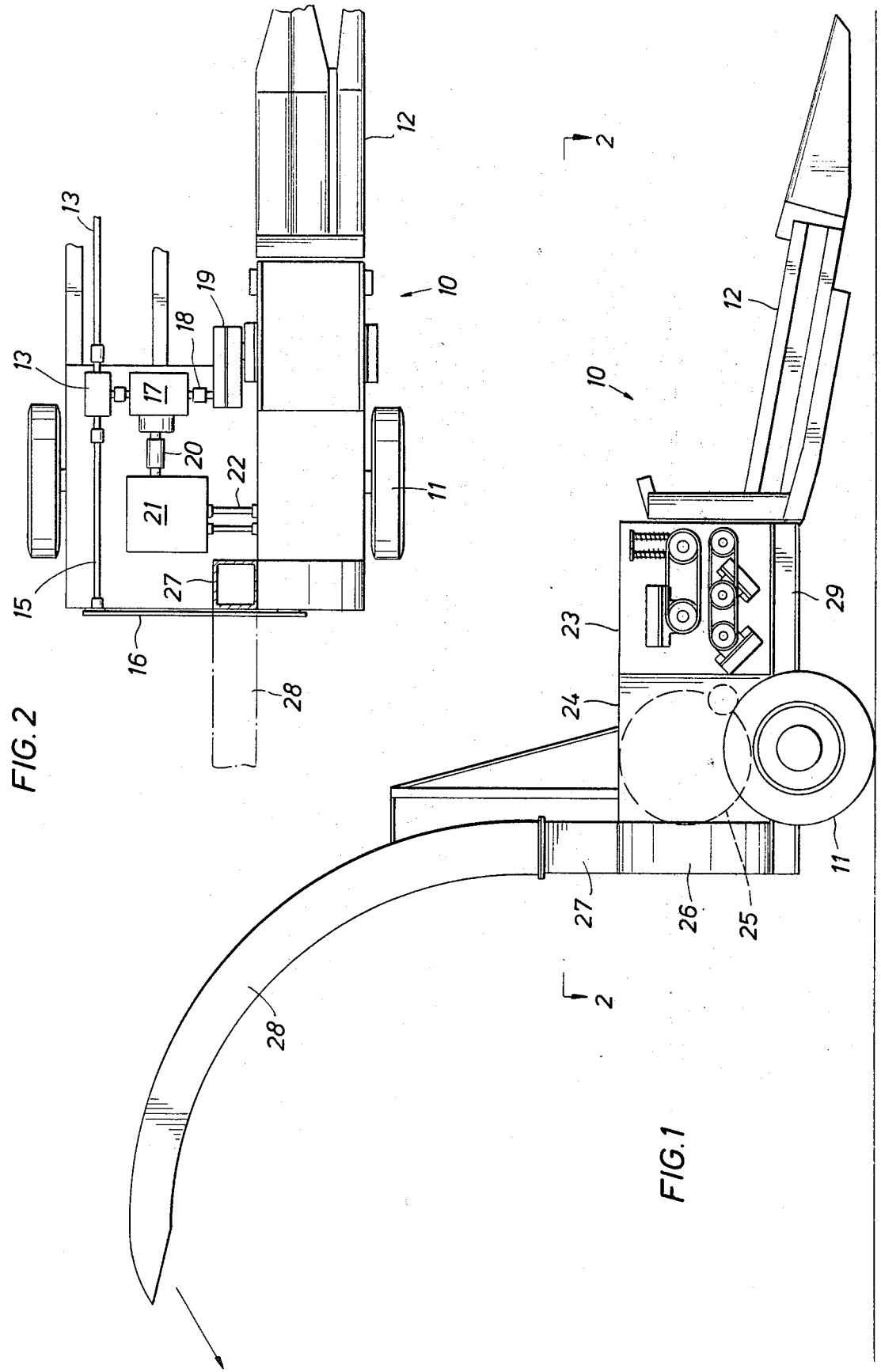

INFIELD MOBILE SYRUP EXTRACTOR

BACKGROUND OF THE DISCLOSURE

This apparatus is a harvesting machine. It is particularly useful with a stalk crop. The term stalk crop refers to a crop which grows in the form of stalks. The stalks are typified by sweet sorghum or sugar cane. They typically grow a leaved stalk which stands reasonably tall. Typically, the stalk can be upwards of two or three meters tall and is a few centimeters in diameter. It normally has a hollow stalk of fibers. It is the kind of crop which is best harvested by clear cutting of the field in which it is mature. A field of sweet sorghum or sugar cane is thus harvested by moving the apparatus of this disclosure through the field, feeding the stalks, ideally without leaves, into the apparatus which moves into a row to force the stalks into the harvester. The present apparatus incorporates such a cutting device, and the preferred and illustrated embodiment discloses a single row cutting head typified by Model CB 600 manufactured by Gehl. This apparatus is ideally appended to the Gehl cutting apparatus. It thus cooperates with the cutting apparatus to receive the individual cut stalks in a continuous flow as the harvesting machinery moves through the field, and the stalks are thereafter chopped or cut. The fibrous mass which remains after liquid extraction is blown out of the machine and is distributed onto the field. Returning the chopped stalks to the field is a wise soil preservation technique.

This apparatus is particularly adapted for use with stalk crops having a wide range of stalk dimensions. For instance, the device will operate quite nicely with small, thin reed-like stalks. It will also crush and extract the liquid of interest from heavy, large stalks. The device is able to handle a relatively high throughput. This aids in permitting the device to run through the field at a more rapid rate. Conversely, should the harvest be skimpy, the rate of processing may be severely reduced but this device nevertheless continuously extracts a liquid from the feed stock, without regard to the rate at which the feed stock is furnished.

This device assists in extracting a liquid from stalk crops. The liquid is an extraction obtained by crushing. The liquid is principally water and various soluable sugars or carbohydrates from the stalk. To some extent, rind and pith fibers may be chopped so finely that they are recovered also with the liquid material. The liquid that is recovered is described hereinafter as the syrup. The cut stalk, after chopping and before crushing, is defined hereinafter as billets.

With the foregoing problem in view, this apparatus is described in summary fashion as a harvesting machine which finds application in harvesting stalk crops, particularly sweet sorghum and sugar cane. The device includes a cutter which cuts the stalk crop near the ground to recover most of the stalk. The stalk falls into the equipment and is fed conveyor fashion into the apparatus. The entire stalk is first passed through a pair of spaced rollers. The rollers rotate in opposite directions to feed the stalks between them. The two rollers are equipped with knife edges or splines. While they do not have to be sharp as a knife, they nevertheless function similar to knife or clamp and are sharp to pinch the stalks at a number of spaced points. The pinched segments are normally not separated from the stalk because they may hang tenuously together on fibers. The many stalks are fed in a continuous flow into the next portion of the apparatus, an extraction roller. The extraction roller comprises a top roller and a pair of facing lower rollers. The lower rollers mesh closely with the top roller. The top roller has a grooved outer face which is formed of metal.

As the stalks pass the extraction roller, the stalks are squeezed or crushed. The top roller is a grooved roller working against a pair of meshing rollers. The first is grooved while the second is smooth. The top roller, being grooved, cooperates with the other rollers to squeeze and otherwise crush the stalks. Liquid flows downwardly into a container, and this comprises the syrup of interest. The crushed stalks are ejected from the apparatus.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention are not to be considered limiting of its scope, for the invention may admit to other equally effective embodiments.

FIG. 1 is a side view of the harvesting apparatus of this disclosure;

FIG. 2 is a plan view of the structure shown in FIG. 1 showing additional details of construction including a power takeoff mechanism for providing power to the equipment for its operation;

FIG. 5 is a sectional view through the apparatus showing details of construction of the several rollers illustrated in FIG. 3 wherein FIG. 5 shows a bottom located collection chamber for the liquid extract obtained from the stalk crops.

DETAILED DESCRIPTION OF THE PREFERRED AND ILLUSTRATED EMBODIMENT

Figure 3:
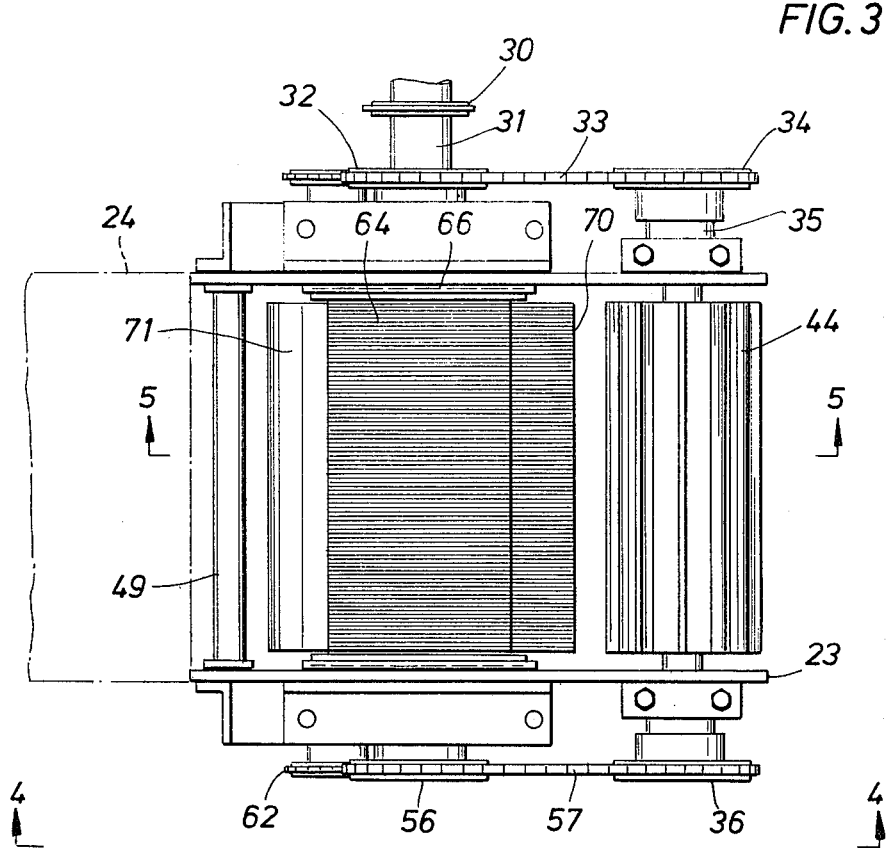
FIG. 3 is a top or plan view of the apparatus of this disclosure with the top removed to illustrated internal details of construction for the apparatus.

Attention is directed to FIG. 1 of the drawings which shows a harvesting apparatus identified by the numeral 10. The harvesting device is constructed in accordance with the teachings of this disclosure. It, therefore, includes a basic support structure resting on a pair of tired wheels 11, and is adapted to be pulled by a tractor at a suitable rate of speed. The apparatus includes a Gehl single row cutter head 12. It is attached at the front and extends forwardly at one side as better shown in FIG. 2. This is a bought item which is incorporated to cut the stalks near the ground and forward motion of the device forces the cut stalks back towards the harvesting machine 10. The cut stalks are fed into the machine at an open end.

FIG. 2 discloses a shaft 13 adapted to be connected to a power takeoff (PTO) on the tractor which pulls the equipment. This inputs power to a bevel gear operated mechanism at 14. It drives an output shaft 15. The shaft 15, in turn, drives a flexible belt drive 16 on the back of the equipment for purposes to be described. The bevel gear drive mechanism has an output shaft which outputs rotational power to a gear box 17, and the gear box 17, in turn, drives a shaft 18. The shaft 18 drives several belts, these belts being enclosed within safety belt housings 19 shown in FIG. 2. The belts power the equipment to be described in FIGS. 3 and 4. In addition, the gear box 17 has another output via the shaft 20 to a gear box 21. It also drives via shafts 22 blower and chopper equipment to be described.

Certain portions of the framework have been omitted for sake of clarity. The tongue or hitch mechanism at the front end of the equipment has also been omitted. Briefly, the apparatus shown in FIGS. 1 and 2 is hitched to a tractor and is pulled through the field. It is operated with the stalk cutter 12 at the marginal edge of the swath cut through the field. This enables the device to pick up row after row without driving the tractor through the uncut crop. So to speak, the tractor is offset to avoid running over the crop. It is ideally used for a crop which is planted in rows. This apparatus functions well by cutting one row at a time with the embodiment illustrated in FIGS. 1 and 2. An alternate construction requires the use of two stalk cutters in a side-by-side configuration, widening of the equipment to be described, thereby yielding a device which can simultaneously cut and harvest two rows. This is a scale factor which can be modified as required.

Returning now to FIG. 1 of the drawings, a cabinet or housing 23 encloses the apparatus of this disclosure which chops and crushes the stalk crop. It is located in advance of an adjacent housing 24. The housing 24 encloses a rotating pulverizer 25. The rotating chopper or pulverizer 25 chops the dry material into small pieces. The dry material is forced to the rear into a cylindrical housing 26. The housing 26 is cylindrical. It includes a squirrel cage blower. The squirrel cage blower receives its power from the flexible belt drive 16 shown in FIG. 2. It blows the chopped, dry particles on rotation of the squirrel cage blower, and they emerge through the chute 27 shown in FIG. 2, the chute being joined to a hollow curved conduit 28 shown in FIG. 1. This broadcasts the chopped particles onto the ground or into a trailing cargo truck for collection. The structure includes a suitable trailer framework 29 to support all of the equipment described to this juncture, the framework 29 being supported by the tires 11.

Figure 4:
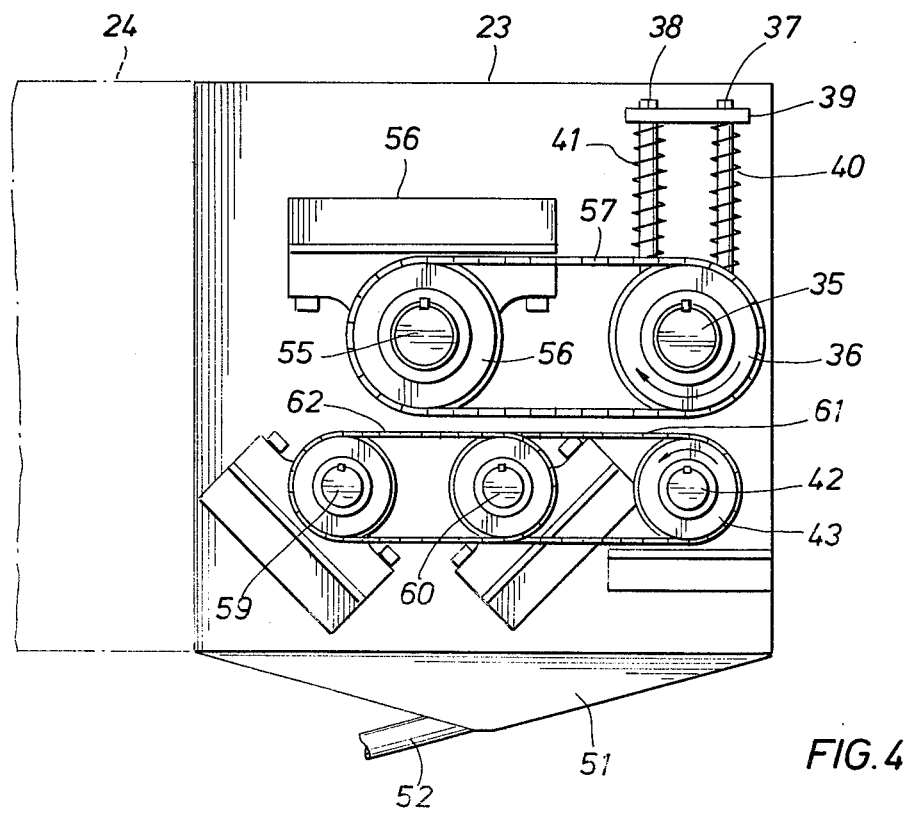
FIG. 4 is a side view of the apparatus shown in FIG. 3 arranged at an orthogonal angle showing a drive system and mounting blocks for the various rollers included in FIG. 3.

Attention is next directed jointly to FIGS. 3 and 4. In FIG. 4, the cabinet or housing has been omitted, at least on the sides, to expose the apparatus. FIG. 4 shows a side view of the power drive mechanism which is incorporated. It will be recalled that this equipment is driven by suitable flexible belt drives enclosed within the safety housing 19 shown in FIG. 2. Needless to say, that safety housing has been omitted from the remainder of the drawings. Considering FIGS. 3 and 4 jointly, the numeral 30, in FIG. 3, identifies an outwardly located belt drive pulley. It is rotated by the PTO of the tractor via the linkage shown in FIG. 2. It is joined to a shaft 31, the shaft 31, in turn, supporting another pulley 32. The pulley 32 is engaged with a V-belt drive 33 which extends to a pulley 34. The pulley 34 is supported on a shaft 35. The shaft 35 is illustrated in FIG. 4 extending across the full width of the equipment. The two ends of the shaft are exposed, one supporting the drive pulley, and the opposite supporting a similar pulley 36. The pulleys 34 and 36 drive the shaft 35 synchronously with another shaft as will be described.

The shaft 35 is supported in a yoke behind the pulley 36. The yoke itself is forced downwardly. The yoke is supported on a pair of telescoping rods 37 and 38. The rods telescope upwardly and slide back and forth in a guide 39. The yoke is forced downwardly by coil springs 40 and 41. The springs 40 and 41 bear on the support yoke which, in turn, forces the shaft 35 downwardly. The shaft 35 can thus move upwardly and downwardly as well as rotate. As it moves upwardly or downwardly, this enables it to move closer to a similar shaft 42. The shafts 35 and 42 are parallel to one another. The shaft 42 also supports an end located pulley 43 shown in FIG. 4.

Figure 5:
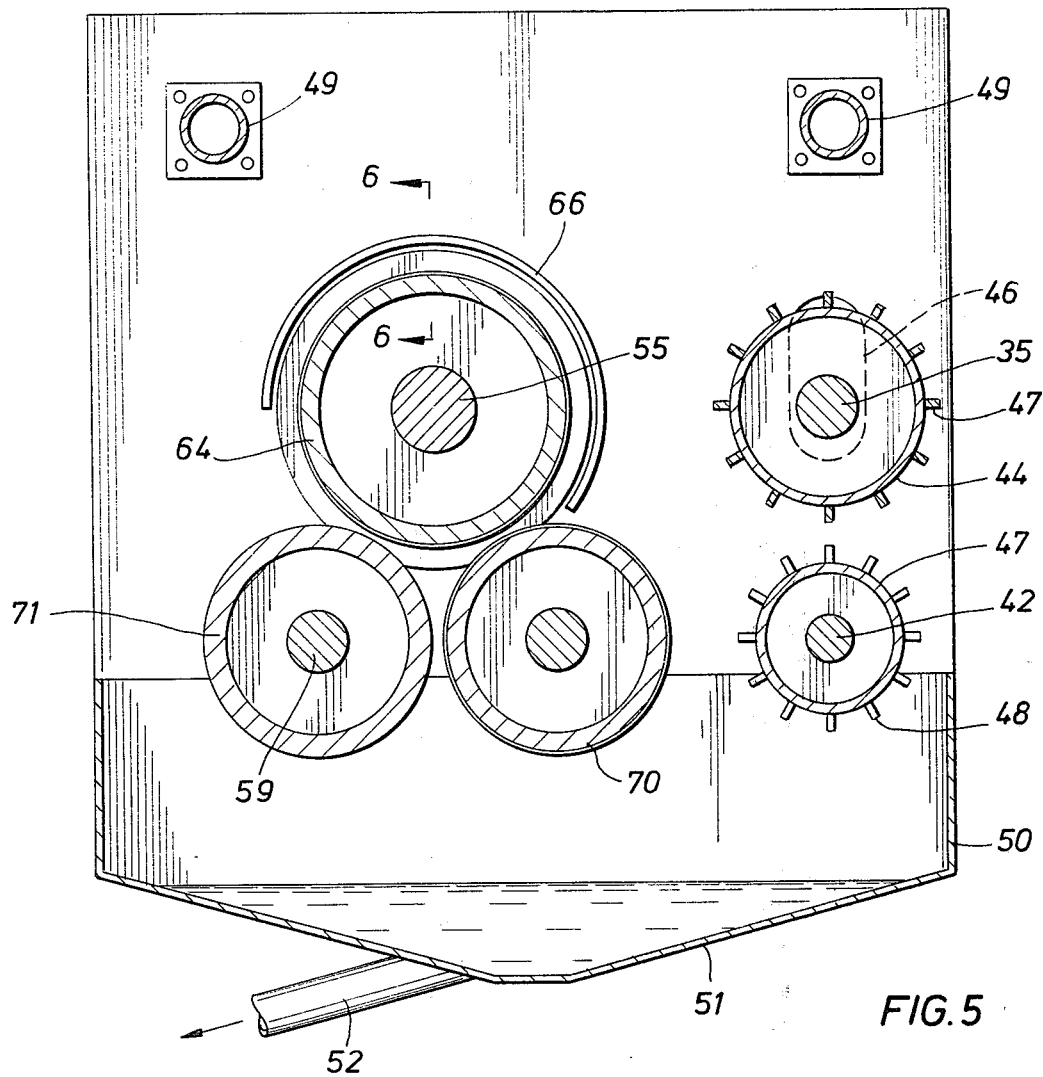

Attention is momentarily directed to FIG. 5 of the drawings. There, the shaft 35 is shown supporting a drum 44 concentrically thereabout. The shaft 35 is able to move upwardly and downwardly through the elongate 46 represented in dotted line in FIG. 5. The shaft is carried on the yoke for movement in the slot 46. It can ride up and down.

The drum 44 is equipped with erect blades or splines 47. The blades 47 are lengthwise ridges on the cylindrical surface of the drum. In like fashion, the shaft 42 is concentric within a similar drum 47. It is also equipped with matching splines or edges 48.

The two drums shown in FIG. 5 rotate in opposite directions. They are preferably constructed with erect and parallel blades or splines 47 and 48 at approximately equal spacing. This enables the two to be rotated synchronously such that the pinching splines come together, somewhat in the fashion of scissor edges which come into contact with one another tangentially. This approach enables the equipment to pinch stalks therebetween, and particularly enables the stalks to be grasped. The stalk is pinched at a number of places depending on the spacing of the crushing blades. The stalks have a length which is fairly long and are forced further into the machinery as will be described. Moreover, the stalks are fed smoothly or inconsistently between the two rotating drums or rollers. If there are none, the spring mounting mechanism shown in FIGS. 3 and 4 forces the two drums closer together. This enables the pinching splines to pass very close to one another. Ideally, the range of travel of the movable drum is limited so that the pinching splines do not clash or otherwise bang together. Rather, the top drum is shock mounted, the resilient means urging it toward contact but it is able to move further apart to enable different thicknesses of stalks to be handled. This occurs when several stalks are fed between the crushing rollers simultaneously.

As described to this juncture, individual stalks are pinched at several locations as they flow from the right to the left as viewed in FIG. 5. They have a trajectory or path of flow which is somewhat elevated in FIG. 5. They are kicked back toward the remainder of the equipment shown on the left of FIG. 4.

FIG. 5 shows a set of spacer reinforcing rods 49 at the top of the equipment. They hold the side walls together. The right hand side of the equipment is open. There is a collection tray 50. It is defined by the bottom 51 which tapers in a funnel-like construction to a drain pipe 52. The syrup which is squeezed from the stalk crop is extracted through the pipe or conduit 52, running for instance to a storage tank. Gravity flow or pumping may be used. Whatever the case, the syrup is collected within the bottom portion of this structure which is encircled with the wall 50, and any liquid which is recovered from the material is thereby stored for subsequent use.

The cabinet or housing shown in FIG. 5 is open at the top edges at the right and left. This enables entire stalks to be fed towards FIG. 5 from the right and they are processed to the left.

Returning now to FIG. 4 of the drawings, the numeral 55 identifies a fixed shaft. It supports an external pulley 56, and a flexible belt 57 is engaged with it. The belt synchronizes rotation of the shaft 35 and the shaft 55. Both shafts rotate in unison. The shaft 55 is supported on a pillow block assembly 56. The pillow block is attached to the end wall of the equipment or housing. The shaft passes through the end wall. In like fashion, additional shafts 59 and 60 are incorporated. They are also driven in the same manner from the shaft 42 by means of flexible belt drives 61 and 62. The flexible belt drives 61 and 62 again assure synchronous operation.

The shafts 55, 59 and 60 are all fixed in relative location. Moreover, they are support shafts for rollers which are better shown in FIGS. 5 and 6. The direction of rotation of these rollers should be noted. The shaft 55 in FIG. 4 rotates clockwise. The shafts 59 and 60 rotate in the opposite direction.

Figure 6:
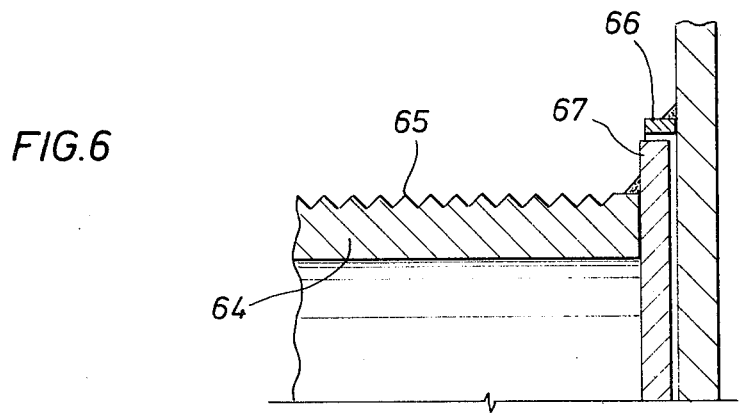
FIG. 6 is a sectional view taken along the line 6—6 of FIG. 5 showing details of construction of the roller which crushes the stalks.

In FIG. 5 of the drawings, the shaft 55 is shown centered within an encircling drum 64. The drum 64 is a fairly large diameter drum or roller. It is constructed with a set of grooves. Perhaps it can be described in the another fashion, namely, it is constructed with a set of ridges 65 better shown in FIG. 6. The drum is formed with innumerable peaks and valleys which define sharp cutting edges. FIG. 6 further discloses a fixed circular lip 66 which overhangs the drum 64. This has significance in preventing liquid from flowing along the end of the drum. Indeed, the drum preferably stands somewhat tall with a peripheral lip 67 extending radially outwardly at both ends to prevent splashing around the end of the drum.

The grooved drum 64 cooperates with a front squeeze roller 70 which is constructed in the same fashion. That is, it is grooved. It meshes with the drum 64. It rotates at a speed enabling the two to crush material between them. They are spaced relatively close. Moreover, a smooth drum 71 is on the rearward drive shaft 59, and this roller cooperates with the large crushing roller 64 to feed the chopped and pulverized material to the rear of the equipment.

The several rollers shown in FIG. 5 operate in synchronism. An entire stalk is pushed into the equipment. The stalk is drawn into the equipment as the chopping rollers engage it. They are forced together to pinch the stalk at a number of locations. The stalks are thrown to the rear of the two rollers. This motion carries the stalks to a position on top of the front grooved roller 70. They are carried into the gap between the two grooved rollers 64 and 70. The many stalks are caught in the gap and are crushed. On crushing, the dry material tends to feed through the gap between the first two drums and comes into contact with the smooth roller or drum 71. The roller 71 sometimes gets wet and will slip when pulling a large supply of stalks. Improved gripping is achieved by placing small, lenthwise beads of approximately ⅛th inch height on the roller 71. It finishes by squeezing any remnants of the recoverable liquid from the pulp. By and large, the liquid content flows downwardly, dripping off the rotating drums 70 and 71. The pulp, that is, the dry material formed by operation of the device, is slung to the rear of the equipment, and this direction carries it out of the apparatus shown in FIG. 5.

The crushed material, after squeezing, is significantly dry. This dry, crushed or pulverized material is thrown to the left of the equipment shown in FIG. 5. It then engages the large crusher 25 shown in FIG. 1. In turn, this material is processed into the squirrel cage blower at 26 whereupon it is blown from the equipment.

The device of this disclosure operates in the following manner. On being pulled behind a tractor, and assuming the PTO is connected, the apparatus is aligned with a first row of stalk plants to be cut. They are cut by forcing the stalk plants into the gap of the cutter 12. It cuts them from the ground and funnels them upwardly. As viewed in FIG. 1, it operates as a conveyor moving from the right to the left. The stalks plants are carried to the end of the cutter head 12. Inevitably, they are fed into the crushing apparatus shown in FIGS. 3, 4 and 5. The plants are pulled into the equipment by the rotating chopping cutters shown at the right of FIG. 5. Long stalks are pulled into the cutters from the open or right side. They are fed into the apparatus for the express purpose of pulling into the crushers. While there might be some recovery of usable syrup at this stage, the bulk of the liquid is recovered by the crushers shown at the left of FIG. 5 which include the two grooved rollers and the one smooth roller. Liquid extraction occurs when the liquid drips to the bottom. The feed stock thus travels into the three squeeze rollers which collectively extract the liquid. The feed material is ejected to the left. After it has been ejected to the left, it then enters the chopper compartment including the chopper 25. This is a bought item which is used to pulverize the remnants of the material.

Assume that the stalk which is handled by the row cutter 12 stands two meters tall. That stalk is not normally broken into a number of segments but breaking may occur to form pieces perhaps five to thirty centimeters in length. Complete severing is not required and does not normally occur; typically, the stalk is slightly pinched to draw the stalk into the crushers. Whatever the case, occasionally pinched stalks are forced to the left. These individual stalks are fed into the two serial gaps in the rollers shown in FIG. 5 and the stalk is crushed. It is divided into two parts, one being the syrup which drips to the bottom and the drier material which is treated as waste. The stalks might be any practical length before crushing. They emerge as a fibrous mass, and sometimes individual stalks will mat together to form a continuous fibrous mass flowing to the left of FIG. 5. Whatever the case, they are fed into the chopper 25. It converts the fibrous mass into a number of chopped fibrous elements which are perhaps only a few centimeters in length. The chopped particles are then fed into the centrifical blower and are ejected from the equipment as a desirable waste product.

Attention is next directed to FIG. 1 of the drawings which shows the power takeoff input and the remainder of the power driven equipment. All of the equipment is ideally powdered from the PTO of the tractor to avoid the necessity of multiple power sources. Scale factors, including the relative rate of the rotating machinery, can be adjusted in the PTO power distribution system including the various gear boxes and flexible (belt or chain) belt drives. The gearing and drive system can be altered as required. Indeed, the PTO can be omitted and a self-contained power plant for the extractor can be used.

While the foregoing is directed to the preferred embodiment, the scope is determined by the claims which follow.

We claim:

1. An apparatus for recovering a desirable syrup product from a stalk crop wherein individual stalks, after cutting from the ground, are fed into said apparatus and wherein the apparatus comprises:
   (a) a pair of self-adjusting input rollers which cooperatively rotate relative to one another for engaging a stalk which is fed between said rollers and wherein said rollers include means for advancing a stalk therebetween;
   (b) syrup squeezing roller means spaced from said input rollers and positioned to receive the stalks, wherein said squeezing roller means includes a pair of oppositely rotated spaced rollers having outer surfaces, which outer surfaces are grooved and mesh with one another and wherein said rollers crush the stalk crop therebetween for extracting the syrup from the stalk crop;
   (c) bottom located syrup collection means for recovering liquid dripping from crushed stalks;
   (d) chopper means for pulverizing the stalk crop; and
   (e) blower means for ejecting the drier material recovered from stalks after recovery of syrup therefrom.

2. The apparatus of claim 1 wherein said squeezing roller means includes a third roller having a smooth outer surface, said third roller squeezing remmants of the syrup from the stalk crop and ejecting dry stalk material to said chopper means.

3. The apparatus of claim 1 further including end walls enclosing said input rollers and said crushing rollers above said syrup collection means.

4. The apparatus of claim 1 further including lengthwise pinching splines on said input rollers for engaging and grasping a stalk on serially engaging first and second splines with a stalk.

* * * * *